US012574646B2

(12) United States Patent
Tu et al.

(10) Patent No.: US 12,574,646 B2
(45) Date of Patent: Mar. 10, 2026

(54) DETECTION APPARATUS AND METHOD, COMPUTER DEVICE, STORAGE MEDIUM, AND PROGRAM PRODUCT

(71) Applicant: CONTEMPORARY AMPEREX TECHNOLOGY (HONG KONG) LIMITED, Hong Kong (CN)

(72) Inventors: Yinhang Tu, Ningde (CN); Yifei Gao, Ningde (CN); Yunfei Ma, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 47 days.

(21) Appl. No.: 18/503,789

(22) Filed: Nov. 7, 2023

(65) Prior Publication Data

US 2024/0073532 A1 Feb. 29, 2024

Related U.S. Application Data

(63) Continuation of application No. PCT/CN2023/084763, filed on Mar. 29, 2023.

(30) Foreign Application Priority Data

Aug. 26, 2022 (CN) .......................... 202211034358.7

(51) Int. Cl.
H04N 23/695 (2023.01)
H04N 23/56 (2023.01)
H04N 23/90 (2023.01)

(52) U.S. Cl.
CPC ........... *H04N 23/695* (2023.01); *H04N 23/56* (2023.01); *H04N 23/90* (2023.01)

(58) Field of Classification Search
CPC ...... H04N 23/695; H04N 23/56; H04N 23/90; H04N 23/74; Y02E 60/10
See application file for complete search history.

(56) References Cited

U.S. PATENT DOCUMENTS

2010/0328435 A1* 12/2010 Puah .................... H04N 13/254
348/47
2015/0170356 A1 6/2015 Simmons
(Continued)

FOREIGN PATENT DOCUMENTS

CN 107389687 A 11/2017
CN 110823905 A 2/2020
(Continued)

OTHER PUBLICATIONS

The European Patent Office (EPO) The Extended European Search Report for Application No. 23800305.7, Sep. 10, 2024 7 Pages.
(Continued)

*Primary Examiner* — Nasim N Nirjhar
(74) *Attorney, Agent, or Firm* — ANOVA LAW GROUP, PLLC

(57) ABSTRACT

A detection apparatus includes a support, at least one driving apparatus provided on the support, and a first movable module. The at least one driving apparatus includes a first driving apparatus, and the first driving apparatus is connected to the first movable module. The first movable module is provided with a first sliding assembly, and a first camera connected to the first sliding assembly. The first driving apparatus is configured to control the first sliding assembly to move in a first direction to drive the first camera to move close to or away from a material to be photographed. An included angle between the first direction and a vertical direction is less than or equal to a preset angle threshold.

14 Claims, 6 Drawing Sheets

(56) References Cited

U.S. PATENT DOCUMENTS

| | | | |
|---|---|---|---|
| 2016/0193681 A1* | 7/2016 | Pesme | B23K 9/1274 |
| | | | 219/136 |
| 2019/0170694 A1* | 6/2019 | Xiong | B23K 31/125 |
| 2020/0134773 A1* | 4/2020 | Pinter | G01N 21/8806 |
| 2022/0264019 A1* | 8/2022 | Kobayashi | H05K 13/0815 |

FOREIGN PATENT DOCUMENTS

| | | | |
|---|---|---|---|
| CN | 111965198 A | 11/2020 |
| CN | 112161929 A | 1/2021 |
| CN | 113640304 A | 11/2021 |
| CN | 113984785 A | 1/2022 |
| CN | 114113144 A | 3/2022 |
| CN | 114119470 A | 3/2022 |
| EP | 0052813 A2 | 6/1982 |
| EP | 2450663 A1 | 5/2012 |
| JP | 2000266691 A | 9/2000 |
| KR | 20110061001 A | 6/2011 |

OTHER PUBLICATIONS

The China National Intellectual Property Administration (CNIPA) The First Office Action for Chinese Application 202211034358.7, May 20, 2023 21 Pages (With Translation).

The China National Intellectual Property Administration (CNIPA) The Notice of Decision of Granting Patent Right for Invention for Chinese Application 202211034358.7, Aug. 31, 2023 3 Pages (With Translation).

The World Intellectual Property Organization (WIPO) The Written Opinion for PCT/CN2023/084763 Jun. 28, 2023 9 pages (including English translation).

The European Patent Office (EPO) Communication pursuant to Article 94(3) EPC for Application No. 23800305.7, Jun. 2, 2025 2 Pages.

The European Patent Office (EPO) Communication pursuant to Article 94(3) EPC for Application No. 23800305.7 Nov. 11, 2025 4 Pages.

* cited by examiner

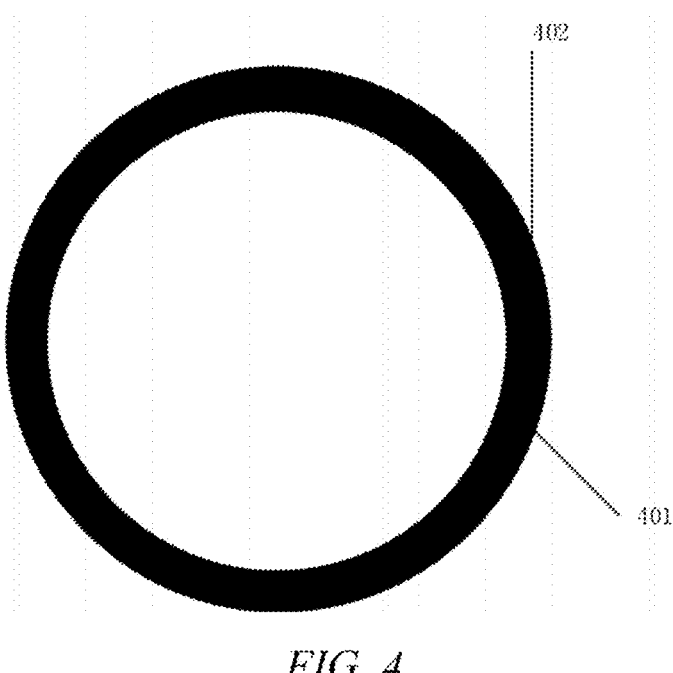

Obtain a first control instruction, where the first control instruction includes compensation information, and the compensation information is information determined based on a distance between a 3D camera and a material to be photographed ⟶ S501

Control, based on the compensation information in the first control instruction, a first sliding assembly to move in a first direction to drive the 3D camera to move close to or away from the material to be photographed, where an included angle between the first direction and a vertical direction is less than or equal to a preset angle threshold ⟶ S502

*FIG. 5*

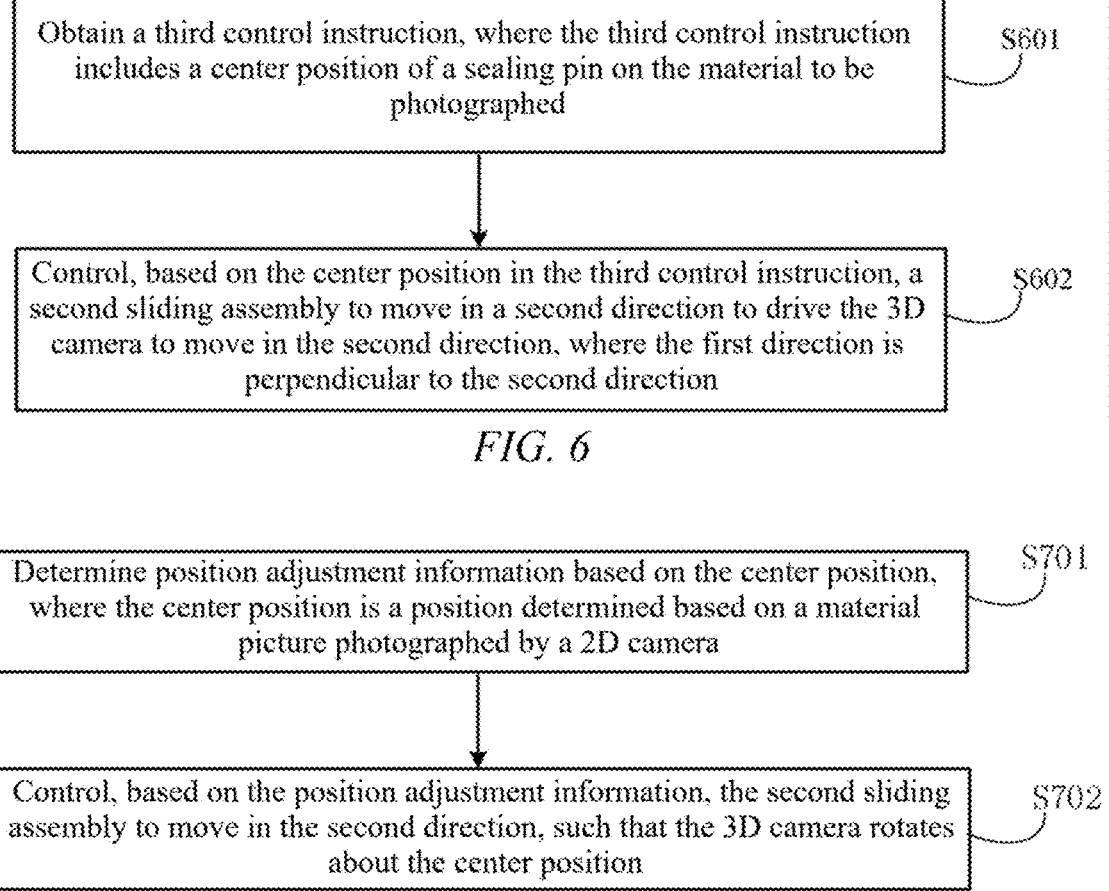

Obtain a third control instruction, where the third control instruction includes a center position of a sealing pin on the material to be photographed — S601

Control, based on the center position in the third control instruction, a second sliding assembly to move in a second direction to drive the 3D camera to move in the second direction, where the first direction is perpendicular to the second direction — S602

*FIG. 6*

Determine position adjustment information based on the center position, where the center position is a position determined based on a material picture photographed by a 2D camera — S701

Control, based on the position adjustment information, the second sliding assembly to move in the second direction, such that the 3D camera rotates about the center position — S702

*FIG. 7*

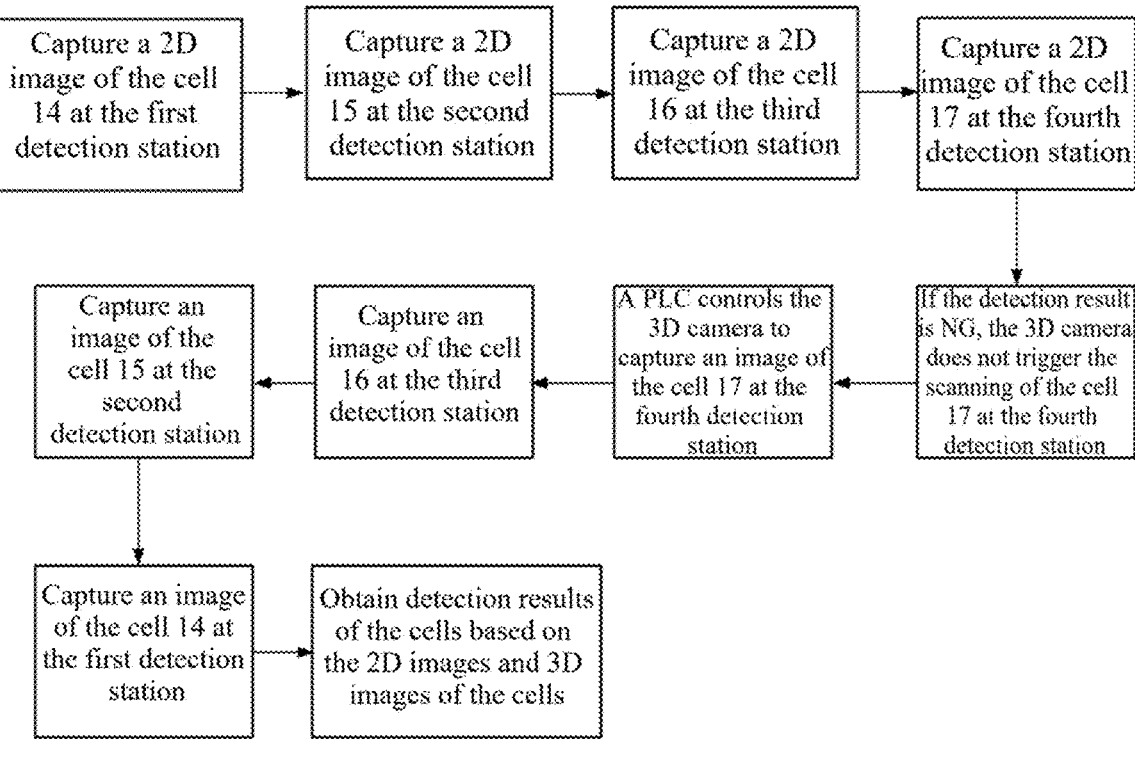

Capture a 2D image of the cell 14 at the first detection station → Capture a 2D image of the cell 15 at the second detection station → Capture a 2D image of the cell 16 at the third detection station → Capture a 2D image of the cell 17 at the fourth detection station Capture an image of the cell 15 at the second detection station ← Capture an image of the cell 16 at the third detection station ← A PLC controls the 3D camera to capture an image of the cell 17 at the fourth detection station ← If the detection result is NG, the 3D camera does not trigger the scanning of the cell 17 at the fourth detection station Capture an image of the cell 14 at the first detection station → Obtain detection results of the cells based on the 2D images and 3D images of the cells

*FIG. 8*

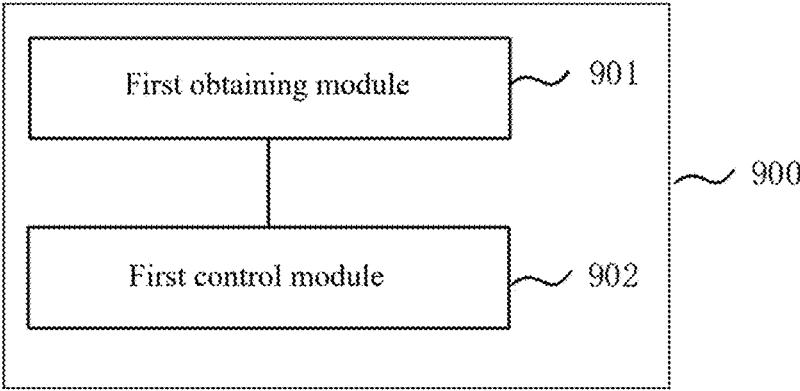

First obtaining module — 901

900

First control module — 902

*FIG. 9*

DETECTION APPARATUS AND METHOD, COMPUTER DEVICE, STORAGE MEDIUM, AND PROGRAM PRODUCT

CROSS-REFERENCE TO RELATED APPLICATIONS

The present application is a continuation of International Application No. PCT/CN2023/084763, filed on Mar. 29, 2023, which claims priority to Chinese patent application no. 202211034358.7, entitled "DETECTION APPARATUS AND METHOD, COMPUTER DEVICE, STORAGE MEDIUM, AND PROGRAM PRODUCT", filed on Aug. 26, 2022, which are incorporated herein by reference in their entirety.

TECHNICAL FIELD

The present application relates to the technical field of communications, and in particular, to a detection apparatus and method, a computer device, a storage medium, and a program product.

BACKGROUND ART

In a power cell system, after secondary filling of a cell, a filling port of the cell needs to be sealed by means of sealing pin welding, to prevent liquid leakage, so as to ensure the sealing performance of the cell with liquid filled.

At present, to detect the effect of sealing pin welding, a 3D camera and a 2D camera are secured onto the same movable module. Upon detecting that a cell reaches a detection position, the 2D camera captures a 2D image of the cell under the drive of the movable module. After the completion of image capture by the 2D camera, the movable module drives the 3D camera to return along an original path to capture a 3D image of the cell. Thereafter, the effect of sealing pin welding is detected based on the 2D image and the 3D image.

However, the current detection method has the problem of poor image quality obtained, resulting in erroneous detection.

SUMMARY

On this basis, in view of the above technical problems, there is a need to provide a detection apparatus and method, a computer device, a storage medium, and a program product that can improve the quality of an obtained 3D image, and thus improve the accuracy of detecting the effect of sealing pin welding.

In a first aspect, the present application provides a detection apparatus, the detection apparatus including a support, a driving apparatus provided on the support, and a first movable module, where the driving apparatus includes a first driving apparatus, and the first driving apparatus is connected to the first movable module; the first movable module is provided with a first sliding assembly, and a first camera connected to the first sliding assembly; and the first driving apparatus is configured to control the first sliding assembly to move in a first direction to drive the first camera to move close to or away from a material to be photographed, where an included angle between the first direction and a vertical direction is less than or equal to a preset angle threshold.

In this embodiment of the present application, the first sliding assembly can be controlled, based on the compensation information in the first control instruction, to move in the first direction to drive the first camera to move close to or away from the material to be photographed, such that the distance between the first camera and the material to be photographed is within a depth of field range of the first camera. Therefore, the problem of losing pixels from the first camera can be avoided, thereby improving the quality of a 3D image, and thus improving the accuracy of detecting the effect of sealing pin welding.

In one of the embodiments, the driving apparatus further includes a second driving apparatus provided on the first movable module, and the first movable module is further provided with a rotating assembly connected to the first camera; and the second driving apparatus is configured to control the rotating assembly to rotate in a preset rotation direction to drive the first camera to rotate.

In this embodiment of the present application, the second driving apparatus can control the rotating assembly 18 to rotate in the preset rotation direction, to drive the first camera to rotate, and the first camera performs image capture in an rotating manner, where a light source used during 3D image capture is a laser light source, laser light emitted by the laser light source forms a "cross" shape with a weld bead of a sealing pin, the vertical line representing the weld bead, and the horizontal line representing the laser light, and the laser light can move on this vertical line, to ensure that the laser light cannot be affected by the height of the weld bead when being reflected to a lens of the first camera. Therefore, the problem of losing pixels from the first camera is avoided, further improving the quality of a 3D image, and thus improving the accuracy of detecting the effect of sealing pin welding.

In one of the embodiments, the driving apparatus further includes a third driving apparatus, where the third driving apparatus is connected to a second movable module, and the second movable module is connected to the first movable module; the second movable module is provided with a second sliding assembly connected to the first camera; and the third driving apparatus is configured to control the second sliding assembly to move in a second direction to drive the first camera to move in the second direction.

In this embodiment of the present application, after the material to be photographed reaches a detection station, a PLC can send a material reaching signal to a computer device and control a 2D light source to be turned on; the computer device sends a picture photographing instruction to a second camera after receiving the material reaching signal; the second camera starts to photograph the material to be photographed after receiving the picture photographing instruction, to obtain a 2D image; the computer device obtains the 2D image, determines a center position of a sealing pin on the material to be photographed based on the 2D image, and sends the center position to the PLC; the PLC sends a third control instruction including the center position to the third driving apparatus; and the third driving apparatus controls, based on the center position in the third control instruction, the second sliding assembly to move in the second direction to drive the first camera to move in the second direction. In this way, a center of rotation of the first camera during rotation can be adjusted based on the center position before controlling the first camera to rotate, thereby ensuring that the center of rotation overlaps with or nearly overlaps with the center position of the sealing pin on the material to be photographed, and further improving the quality of an obtained 3D image.

In one of the embodiments, the detection apparatus further includes a second camera connected to the second sliding assembly; the second camera is provided with a coaxial light source and a ring light source;

the third driving apparatus is configured to control the second sliding assembly to move in a third direction to drive the second camera to move in the third direction;

the coaxial light source is configured to light an inner region of a weld bead on the material to be photographed; and the ring light source is configured to light an outer region of the weld bead.

In one of the embodiments, the center position is a position determined based on a material picture photographed by the second camera; and the third driving apparatus is configured to determine position adjustment information of the first camera based on the center position in the third control instruction, and control, based on the position adjustment information, the second sliding assembly to move in a second direction to drive the first camera to move in the second direction.

In one of the embodiments, the second movable module includes a first horizontal module and a second horizontal module connected to each other; the first horizontal module and the second horizontal module are both connected to the first movable module; the second sliding assembly includes a first horizontal sliding assembly provided on the first horizontal module and a second horizontal sliding assembly provided on the second horizontal module; and the third driving apparatus is configured to control the first horizontal sliding assembly to move in a first horizontal direction, and/or control the second horizontal sliding assembly to move in a second horizontal direction.

In a second aspect, the present application further provides a detection method, which is applied to a detection apparatus as described in the first aspect. The method includes:

obtaining a first control instruction, where the first control instruction includes compensation information, and the compensation information is information determined based on a distance between a first camera and a material to be photographed; and controlling, based on the compensation information in the first control instruction, a first sliding assembly to move in a first direction to drive the first camera to move close to or away from the material to be photographed, where an included angle between the first direction and a vertical direction is less than or equal to a preset angle threshold.

In one of the embodiments, the detection method further includes:

controlling, based on a second control instruction, a rotating assembly to rotate in a preset rotation direction to drive the first camera to rotate.

In one of the embodiments, the detection method further includes:

obtaining a third control instruction, where the third control instruction includes a center position of a sealing pin on the material to be photographed; and controlling, based on the center position in the third control instruction, a second sliding assembly to move in a second direction to drive the first camera to move in the second direction.

In one of the embodiments, the detection method further includes:

controlling, based on a fourth control instruction, the second sliding assembly to move in a third direction to drive a second camera to move in the third direction.

In one of the embodiments, the controlling, based on the center position in the third control instruction, a second sliding assembly to move in a second direction includes:

determining position adjustment information based on the center position, where the center position is a position determined based on a material picture photographed by the second camera; and controlling, based on the position adjustment information, the second sliding assembly to move in the second direction, such that the first camera rotates about the center position.

In one of the embodiments, the method further includes:

controlling, based on a fifth control instruction, a first horizontal sliding assembly to move in a first horizontal direction, and/or controlling a second horizontal sliding assembly to move in a second horizontal direction.

In a third aspect, the present application further provides a detection apparatus, the detection apparatus including:

a first obtaining module configured to obtain a first control instruction, where the first control instruction includes compensation information, and the compensation information is information determined based on a distance between a first camera and a material to be photographed; and a first control module configured to control, based on the compensation information in the first control instruction, a first sliding assembly to move in a first direction to drive the first camera to move close to or away from the material to be photographed, where an included angle between the first direction and a vertical direction is less than or equal to a preset angle threshold.

In a fourth aspect, the present application further provides a computer device. The computer device includes a memory and a processor, where the memory stores a computer program, and the processor implements the steps of any one of the methods as described above.

In a fifth aspect, the present application further provides a computer-readable storage medium. The computer-readable storage medium has stored thereon a computer program that, when executed by a processor, implements the steps of any one of the methods as described above.

In a sixth aspect, the present application further provides a computer program product. The computer program product includes a computer program that, when executed by a processor, implements the steps of any one of the methods as described above.

According to the detection apparatus and method, the computer device, the storage medium, and the program product, the detection apparatus includes a support, a driving apparatus provided on the support, and a first movable module, where the driving apparatus includes a first driving apparatus, and the first driving apparatus is connected to the first movable module; the first movable module is provided with a first sliding assembly, and a first camera connected to the first sliding assembly; and the first driving apparatus is configured to control the first sliding assembly to move in a first direction to drive the first camera to move close to or away from a material to be photographed, where an included angle between the first direction and a vertical direction is less than or equal to a preset angle threshold. In this embodiment of the present application, the first sliding assembly can be controlled to move in the first direction to drive the first camera to move close to or away from the material to be photographed, such that the distance between the first camera and the material to be photographed is within a depth of field range of the first camera. Therefore, the problem of losing pixels from the first camera can be avoided, thereby improving the quality of a 3D image, and thus improving the accuracy of detecting the effect of sealing pin welding.

The above description is merely an overview of the technical solutions of the present application. In order to more clearly understand the technical means of the present application to implement same according to the content of the description, and in order to make the above and other objectives, features and advantages of the present application more obvious and understandable, specific implementations of the present application are illustratively described below.

BRIEF DESCRIPTION OF THE DRAWINGS

Various other advantages and benefits will become apparent to those of ordinary skill in the art upon reading the following detailed description of the embodiments. The accompanying drawings are merely for the purpose of illustrating the embodiments, and are not to be construed as limiting the present application. Moreover, like components are denoted by like reference numerals throughout the accompanying drawings. In the drawings:

FIG. 4 is a schematic diagram of a weld bead after welding according to an embodiment of the present application;

FIG. 5 is a schematic flowchart of a detection method according to an embodiment of the present application;

FIG. 6 is a schematic flowchart of another detection method according to an embodiment of the present application;

FIG. 7 is a schematic flowchart of a control method for a second sliding assembly according to an embodiment of the present application;

FIG. 8 is a schematic flowchart of yet another detection method according to an embodiment of the present application;

FIG. 9 is a schematic structural diagram of a detection apparatus according to an embodiment of the present application.

DETAILED DESCRIPTION OF EMBODIMENTS

Figure 1:
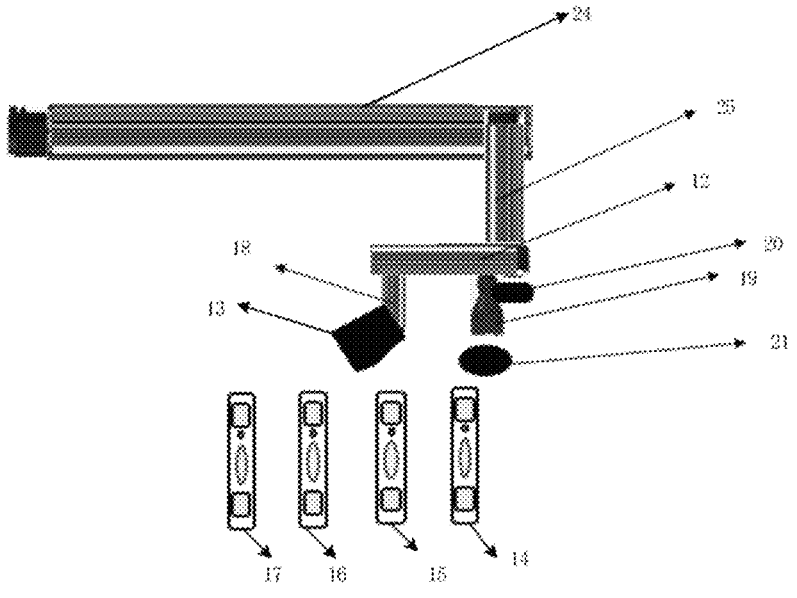
FIG. 1 is a schematic structural diagram of a detection apparatus according to an embodiment of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

In order to make the objective, technical solutions, and advantages of the present application clearer, the present application is further described in detail below with reference to the accompanying drawings and the embodiments. It should be understood that the specific embodiments described herein are merely used to explain the present application and are not intended to limit the present application.

At present, the process of detecting the effect of sealing pin welding is as follows. A 3D camera and a 2D camera are secured onto the same movable module. Upon detecting that a cell reaches a detection position, the 2D camera captures a 2D image of the cell under the drive of the movable module. After the completion of image capture by the 2D camera, the movable module drives the 3D camera to return along an original path to capture a 3D image of the cell. Thereafter, the effect of sealing pin welding is detected based on the 2D image and the 3D image.

However, when an actual distance between the cell and the 3D camera is not within a depth of field range of the 3D camera, pixels are lost from the 3D camera during image capture, which causes erroneous detection of the effect of sealing pin welding. The depth of field range of the 3D camera is a range in which a camera can perform clear imaging. For example, the depth of field range of the 3D camera is 30 mm to 35 mm, and if the actual distance is not within this depth of field range of 30 mm to 35 mm, erroneous detection of the effect of sealing pin welding may be caused.

Figure 2:
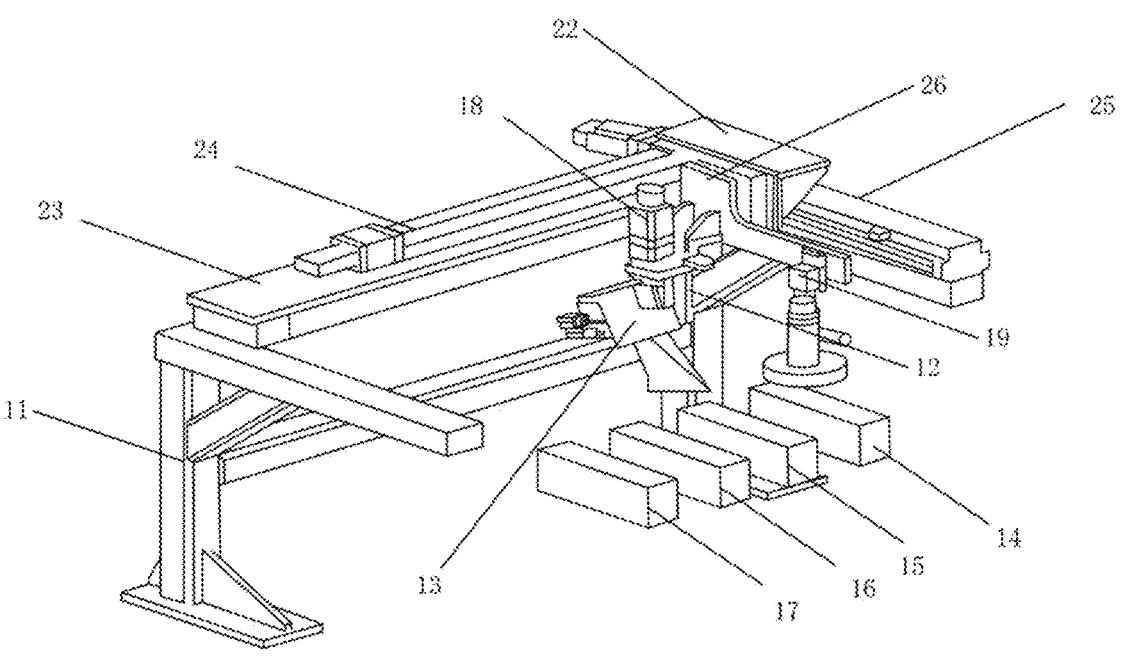
FIG. 2 is a schematic structural diagram of another detection apparatus according to an embodiment of the present application.

In order to solve the above technical problems, the present application provides a detection apparatus. As shown in FIGS. 1 and 2, FIG. 1 is a schematic structural diagram of a detection apparatus according to an embodiment of the present application, and FIG. 2 is a schematic structural diagram of another detection apparatus according to an embodiment of the present application. FIG. 1 is a top view of the detection apparatus. The detection apparatus includes a support 11, a driving apparatus provided on the support 11, and a first movable module 12, where the driving apparatus includes a first driving apparatus, and the first driving apparatus is connected to the first movable module 12; the first movable module 12 is provided with a first sliding assembly, and a first camera 13 connected to the first sliding assembly; and the first driving apparatus is configured to control the first sliding assembly to move in a first direction to drive the first camera 13 to move close to or away from a material to be photographed, where an included angle between the first direction and a vertical direction is less than or equal to a preset angle threshold.

The preset angle threshold may be a value equal to 0 or close to 0. For example, if the preset angle threshold is equal to 1°, the first direction may be the same direction as the vertical direction, or the included angle between the first direction and the vertical direction may be less than 1°. The first camera may be a 3D camera.

The material to be photographed includes, for example, cells 14, 15, 16, and 17 shown in FIG. 2. The material to be photographed may include one or more cells.

In this embodiment of the present application, after the material to be photographed reaches a detection station and before the first camera 13 captures an image of each material to be photographed, a distance measurement device can be used to measure an actual distance between each material to be photographed and the first camera 13, and send the actual distance to a computer device. The computer device determines compensation information based on the actual distance and a preset depth of field range of the first camera 13, and sends the compensation information to a programmable logic controller (PLC). Then, the PLC sends a first control instruction including the compensation information to the first driving apparatus, such that the first driving apparatus moves close to or away from the material to be photographed based on the compensation information in the first control instruction, thereby ensuring that the distance between the material to be photographed and the first camera 13 is within the depth of field range of the first camera 13.

For example, if the actual distance is 37 mm and the depth of field range of the first camera 13 is 30 mm to 35 mm, indicating that the actual distance is greater than 35 mm and beyond the depth of field range, the computer device may determine that the compensation information is equal to a difference between 37 and 35, that is, the compensation information may be 2 mm. In this case, the first sliding assembly needs to be controlled to move in the first direction to drive the first camera 13 to move close to the material to be photographed, such that the distance between the first camera 13 and the material to be photographed is within the depth of field range after the first sliding assembly is controlled to move in the first direction.

For another example, if the actual distance is 28 mm and the depth of field range of the first camera 13 is 30 mm to 35 mm, indicating that the actual distance is less than 30 mm and beyond the depth of field range, the computer device may determine that the compensation information is equal to a difference between 30 and 28, that is, the compensation information is 2 mm. In this case, the first sliding assembly needs to be controlled to move in the first direction to drive the first camera 13 to move away from the material to be photographed, such that the distance between the first camera 13 and the material to be photographed is within the depth of field range after the first sliding assembly is controlled to move in the first direction.

By means of the detection apparatus provided in the embodiments of the present application, the first sliding assembly can be controlled to move in the first direction to drive the first camera 13 to move close to or away from the material to be photographed, such that the distance between the first camera 13 and the material to be photographed is within a depth of field range of the first camera 13. Therefore, the problem of losing pixels from the first camera 13 can be avoided, thereby improving the quality of a 3D image, and thus improving the accuracy of detecting the effect of sealing pin welding.

In one of the embodiments, as shown in FIG. 2, the driving apparatus further includes a second driving apparatus provided on the first movable module 12, and the first movable module 12 is further provided with a rotating assembly 18 connected to the first camera 13; and the second driving apparatus is configured to control the rotating assembly 18 to rotate in a preset rotation direction to drive the first camera 13 to rotate.

At present, in a new welding process, when a stepped sealing pin has a weld bead that is too high, the outermost and innermost laser light of the weld bead cannot be reflected back to a lens of the first camera 13, which easily results in the problem of a relatively low quality of a 3D image obtained by the first camera 13, causing erroneous detection of the effect of sealing pin welding. For example, there are problems with noise and pixel loss in the 3D image, which cause erroneous detection of the effect of sealing pin welding.

In this embodiment of the present application, controlling the first camera 13 to rotate can enable the first camera 13 to rotate during photographing, such that the problem of a relatively low quality of a 3D image can be further solved. Controlling the first camera 13 to rotate during photographing is enabled in the following way:

after the material to be photographed reaches a detection station, a PLC sends a second control instruction to the second driving apparatus; based on the second control instruction, the second driving apparatus can drive an encoder connected to the second driving apparatus to rotate; the encoder may generate a trigger signal during rotation, and then send the trigger signal to the first camera 13; and the first camera 13 rotates in the preset rotation direction after receiving the trigger signal, to drive the first camera 13 to rotate during photographing. The preset rotation direction may be a clockwise direction or a counterclockwise direction.

The second driving apparatus can control, based on the second control instruction, the rotating assembly 18 to rotate in the preset rotation direction, to drive the first camera 13 to rotate during photographing, and the first camera 13 captures an image in an rotating manner, where a light source used during 3D image capture is a laser light source, laser light emitted by the laser light source forms a "cross" shape with a weld bead of a sealing pin, the vertical line in the shape representing the weld bead, and the horizontal line in the shape representing the laser light, and the laser light can move on this vertical line, to ensure that the laser light cannot be affected by the height of the weld bead when being reflected to a lens of the first camera 13. Therefore, the problem of losing pixels from the first camera 13 is avoided, further improving the quality of a 3D image, and thus improving the accuracy of detecting the effect of sealing pin welding.

In one of the embodiments, as shown in FIG. 2, the driving apparatus further includes a third driving apparatus, where the third driving apparatus is connected to a second movable module, and the second movable module is connected to the first movable module 12; the second movable module is provided with a second sliding assembly connected to the first camera 13; and the third driving apparatus is configured to control the second sliding assembly to move in a second direction to drive the first camera 13 to move in the second direction.

As shown in FIG. 2, the second direction may include a horizontal direction of the X axis 24 and/or a horizontal direction of the Y axis 25.

In this embodiment of the present application, after the material to be photographed reaches a detection station, a PLC can send a material reaching signal to a computer device and control a 2D light source to be turned on; the computer device sends a picture photographing instruction to a second camera 19 after receiving the material reaching signal; the second camera 19 starts to photograph the material to be photographed after receiving the picture photographing instruction, to obtain a 2D image; the computer device obtains the 2D image, determines a center position of a sealing pin on the material to be photographed based on the 2D image, and sends the center position to the PLC; the PLC sends a third control instruction including the center position to the third driving apparatus; and the third driving apparatus controls, based on the center position in the third control instruction, the second sliding assembly to move in the second direction to drive the first camera 13 to move in the second direction. In this way, a center of rotation of the first camera 13 during rotation can be adjusted based on the center position before controlling the first camera 13 to rotate, thereby ensuring that the center of rotation overlaps with or nearly overlaps with the center position of the sealing pin on the material to be photographed, and further improving the quality of an obtained 3D image.

In one of the embodiments, as shown in FIG. 2, the detection apparatus further includes a second camera 19 connected to the second sliding assembly; the second camera 19 is provided with a coaxial light source 20 and a ring light source 21;

the third driving apparatus is configured to control the second sliding assembly to move in a third direction to drive the second camera 19 to move in the third direction, where the third direction may be perpendicular to the first direction;

the coaxial light source 20 is configured to light an inner region of a weld bead on the material to be photographed; and the ring light source 21 is configured to light an outer region of the weld bead.

As shown in FIG. 2, the third direction may include a horizontal direction of the X axis 24 and/or a horizontal direction of the Y axis 25.

In this embodiment of the present application, the third direction in which the second camera 19 is driven to move during photographing of the 2D image of the material to be photographed is opposite to the direction in which the first camera 13 is driven to move during photographing of the 3D image of the material to be photographed. For example, as shown in FIG. 2, in a sealing pin welding machine, the material to be photographed includes four cells. After the four cells are welded side by side, a wheel is rotated to enable the four cells to flow to detection stations. After the cells flow to the detection stations, a PLC sends a material reaching signal to a computer device, the PLC controls a 2D light source to be turned on, and the second camera 19 captures a 2D image of the cell 14 at the first detection station. After the capture of the 2D image of the cell 14 at the first detection station is completed, the third driving apparatus drives the second camera 19 and the first camera 13 to move to the second detection station, the PLC controls the 2D light source to be turned on, and the second camera 19 captures a 2D image of the cell 15 at the second detection station. After the capture of the 2D image of the cell 15 at the second detection station is completed, the third driving apparatus drives the second camera 19 and the first camera 13 to move to the third detection station, the PLC controls the 2D light source to be turned on, and the second camera 19 captures a 2D image of the cell 16 at the third detection station. After the capture of the 2D image of the cell at the third detection station is completed, the third driving apparatus drives the second camera 19 and the first camera 13 to move to the fourth detection station, the PLC controls the 2D light source to be turned on, and the second camera 19 captures a 2D image of the cell 17 at the fourth detection station.

After the capture of the 2D images of the above four cells is completed, the second camera 19 and the first camera 13 can be controlled to return to the first detection station from the fourth detection station along the original path. During the process of controlling the second camera 19 and the first camera 13 to return to the first detection station from the fourth detection station along the original path, 3D images are captured for the cells at the detection stations in sequence.

It should be noted that in conventional techniques, a bowl-shaped light source is used to light a weld bead on a material to be photographed during 2D image capture, and since a stepped sealing pin has a weld bead that is too high, the bowl-shaped light source emits light that cannot be reflected to a lens of the second camera 19 when being irradiated to an outer region of the weld bead, resulting in a dark outer region of the weld bead in an obtained 2D image. However, in this embodiment of the present application, a 2D light source including a combined coaxial light source 20 and ring light source 21 is used, where the coaxial light source 20 lights the inner region of the weld bead on the material to be photographed, and the ring light source 21 lights the outer region of the weld bead, such that lighting of the inner region and the outer region of the weld bead is implemented, reducing the phenomenon of a dark outer region of the weld bead.

Figure 3:
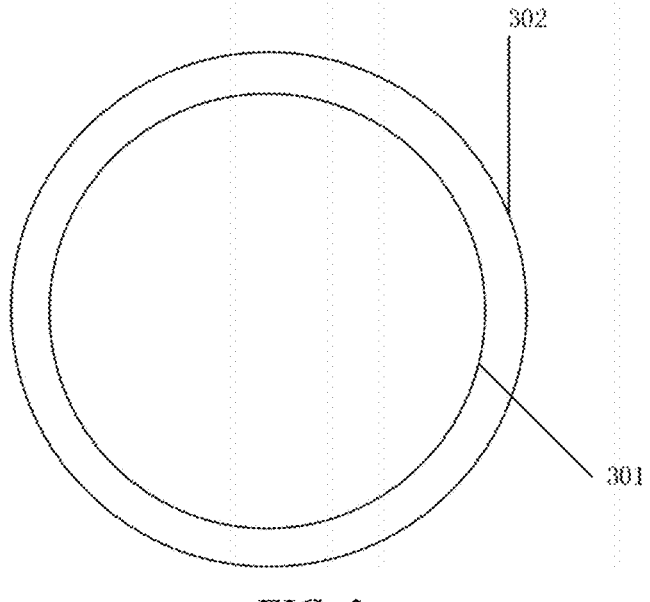
FIG. 3 is a schematic diagram of a weld bead before welding according to an embodiment of the present application.

The weld bead is as shown in FIGS. 3 and 4. FIG. 3 is a schematic diagram of a weld bead before welding according to an embodiment of the present application, and FIG. 4 is a schematic diagram of a weld bead after welding according to an embodiment of the present application. FIG. 3 shows an inner region 301 and an outer region 302 of the weld bead before welding, FIG. 4 shows an inner region 401 of the weld bead after welding and an outer region 402 thereof after welding, and the weld bead after welding is a black ring as shown in FIG. 4.

In one of the embodiments, the center position is a position determined based on a material picture photographed by the second camera 19; and the third driving apparatus is configured to determine position adjustment information of the first camera 13 based on the center position in the third control instruction, and control, based on the position adjustment information, the second sliding assembly to move in a second direction to drive the first camera 13 to move in the second direction.

In this embodiment of the present application, a computer device can determine a center position of a sealing pin from a material picture photographed by the second camera 19, and send the center position to a PLC. The PLC sends the center position to the third driving apparatus, and the third driving apparatus can thus determine position adjustment information of the first camera 13 based on the center position, and control, based on the position adjustment information, the second sliding assembly to move in the second direction such that the first camera 13 can rotate about the center position. Therefore, the quality of an obtained 3D image is further improved.

In one of the embodiments, as shown in FIG. 2, the second movable module includes a first horizontal module and a second horizontal module connected to each other; the first horizontal module and the second horizontal module are both connected to the first movable module 12; the second sliding assembly includes a first horizontal sliding assembly 22 provided on the first horizontal module and a second horizontal sliding assembly 23 provided on the second horizontal module; and the third driving apparatus is configured to control the first horizontal sliding assembly 22 to move in a first horizontal direction, and/or control the second horizontal sliding assembly 23 to move in a second horizontal direction, where the first horizontal direction may be perpendicular to the second horizontal direction, or a difference between an angle formed by the first horizontal direction and the second horizontal direction and 90° may be a value close to 0.

In this embodiment of the present application, as shown in FIG. 2, the third driving apparatus can control the first horizontal sliding assembly 22 to move in the direction of the X axis 24; and/or the third driving apparatus can control the second horizontal sliding assembly 23 to move in the direction of the Y axis 25. The first horizontal direction is, for example, the direction of the X axis 24 in FIG. 2, and the second horizontal direction is, for example, the direction of the Y axis 25 in FIG. 2. In the direction of the X axis 24, the second camera 19 and the first camera 13 can move left and right, and in the direction of the Y axis 25, the second camera 19 and the first camera 13 can move forward and backward. Therefore, the second camera 19 and the first camera 13 photograph the four cells sequentially when moving in the direction of the X axis 24, and the second camera 19 and the first camera 13 adjust positions of the second camera 19 and the first camera 13 in the direction of the Y axis 25 when moving in the direction of the Y axis 25.

It should be noted that the first movable module 12 provided in the embodiments of the present application may further include a fixing member 26, the fixing member 26 being connected to the second camera 19. The rotating assembly 18 included in the first movable module 12 is connected to the first camera, the fixing member 26 included in the first movable module is connected to the second camera 19, the fixing member 26 is connected to the first horizontal sliding assembly 22, the first horizontal sliding assembly 22 can move along the X axis 24, the X axis 24 is connected to the second horizontal sliding assembly 23, and the second horizontal sliding assembly 23 can move along the Y axis 25. Therefore, the first horizontal sliding assembly 22 and the second horizontal sliding assembly 23 can enable the second camera and the first camera to move in the directions of the X axis and the Y axis.

The cameras in the embodiments of the present application have a detection accuracy as follows. The second camera has a detection accuracy of 0.0062 mm, and the first camera has an accuracy of 0.016 mm in the X direction, 0.02 mm in the Y direction, and 0.002 mm in the Z direction. To ensure the second camera to be adjustable up and down, and left and right, the second camera should meet a 2D object distance of 65±20 mm, and the first camera should meet an object distance of 47.5±20 mm and an inclination angle of 20°±15°. The camera is adjustable by a lifting module. According to the compatibility and configuration formulations of a product to be measured, a computer device can implement one-click adjustment of a working distance of a camera through a trigger control provided by software, such that the camera performs clear imaging.

Referring to FIG. 5, FIG. 5 is a schematic flowchart of a detection method according to an embodiment of the present application, and the detection method is applied to a detection apparatus according to any one of the embodiments described above. The method includes:

S501, obtaining a first control instruction, where the first control instruction includes compensation information, and the compensation information is information determined based on a distance between a first camera and a material to be photographed; and S502, controlling, based on the compensation information in the first control instruction, a first sliding assembly to move in a first direction to drive the first camera to move close to or away from the material to be photographed, where an included angle between the first direction and a vertical direction is less than or equal to a preset angle threshold.

In one of the embodiments, the detection method further includes:

controlling, based on a second control instruction, a rotating assembly to rotate in a preset rotation direction to drive the first camera to rotate.

In one of the embodiments, as shown in FIG. 6, FIG. 6 is a schematic flowchart of another detection method according to an embodiment of the present application. The detection method includes the following steps:

S601, obtaining a third control instruction, where the third control instruction includes a center position of a sealing pin on the material to be photographed; and S602, controlling, based on the center position in the third control instruction, a second sliding assembly to move in a second direction to drive the first camera to move in the second direction.

In one of the embodiments, the detection method further includes:

controlling, based on a fourth control instruction, the second sliding assembly to move in a third direction to drive a second camera to move in the third direction.

In one of the embodiments, as shown in FIG. 7, FIG. 7 is a schematic flowchart of a control method for a second sliding assembly according to an embodiment of the present application, and S602 includes:

S701, determining position adjustment information based on the center position, where the center position is a position determined based on a material picture photographed by the second camera; and S702, controlling, based on the position adjustment information, the second sliding assembly to move in the second direction, such that the first camera rotates about the center position.

In one of the embodiments, the method further includes:

controlling, based on a fifth control instruction, a first horizontal sliding assembly to move in a first horizontal direction, and/or controlling a second horizontal sliding assembly to move in a second horizontal direction.

Referring to FIG. 8, FIG. 8 is a schematic flowchart of yet another detection method according to an embodiment of the present application.

1. After cells flow to detection stations, a PLC sends a material reaching signal to a computer device, the PLC controls a 2D light source to be turned on, and the second camera 19 captures a 2D image of the cell 14 at the first detection station.

2. After the capture of the 2D image of the cell 14 at the first detection station is completed, the third driving apparatus drives the second camera 19 and the first camera 13 to move to the second detection station, the PLC controls the 2D light source to be turned on, and the second camera 19 captures a 2D image of the cell 15 at the second detection station.

3. After the capture of the 2D image of the cell 15 at the second detection station is completed, the third driving apparatus drives the second camera 19 and the first camera 13 to move to the third detection station, the PLC controls the 2D light source to be turned on, and the second camera 19 captures a 2D image of the cell 16 at the third detection station.

4. After the capture of the 2D image of the cell at the third detection station is completed, the third driving apparatus drives the second camera 19 and the first camera 13 to move to the fourth detection station, the PLC controls the 2D light source to be turned on, and the second camera 19 captures a 2D image of the cell 17 at the fourth detection station.

5. The PLC controls the first camera to move to the fourth detection station, and the computer device obtains a detection result for the effect of sealing pin welding based on the 2D image of the cell 17 at the fourth detection station, and if the detection result is NG, the first camera does not trigger the scanning of the cell 17 at the fourth detection station.

The cells at the other detection stations are processed in the same manner as the cell 17 at the fourth detection station.

If detection results for the cells at the detection stations are all OK, the PLC can control the first camera to capture the images of the cells at the four detection stations in sequence. Before the capture of the images of the cells, whether to adjust a center of rotation of the first camera needs to be determined based on a center position of a sealing pin on the cell first. If the center of rotation needs to be adjusted, the center of rotation is adjusted before the first camera is driven to capture the images of the cells. Assuming that images of the four cells need to be separately captured in sequence and the center of rotation has been adjusted, the following steps 6 to 9 may be performed.

6. The PLC controls the first camera to capture an image of the cell 17 at the fourth detection station.

7. After the capture of the image of the cell 17 at the fourth detection station is completed, the first camera is moved to the third detection station to capture an image of the cell 16 at the third detection station.

8. After the capture of the image of the cell 16 at the third detection station is completed, the first camera is moved to the second detection station to capture an image of the cell at the second detection station.

9. After the capture of the image of the cell 15 at the second detection station is completed, the first camera is moved to the first detection station to capture an image of the cell 14 at the first detection station.

10. The computer device obtains detection results of the cells based on the 2D images and 3D images of the cells, and uploads the detection results to an upper computer according to a TCP protocol, and the upper computer then feeds the detection results back to a manufacturing execution system (MES).

The computer device obtains the detection results for the cells based on the 2D images and the 3D images of the cells by using an AI detection algorithm.

It should be understood that although the steps in the flowchart that are involved in the embodiments described above are displayed in sequence as indicated by arrows, these steps are not necessarily sequentially executed in the order indicated by the arrows. Unless explicitly described herein, the execution of these steps is not limited to a strict order, instead, the steps may be executed in another order. In addition, at least some of the steps in the flowchart that are involved in the embodiments described above may include multiple steps or multiple stages. These steps or stages are not necessarily executed or completed at the same moment, but can be executed at different moments. These steps or stages are also not necessarily executed in sequence, but can be executed in turn or alternately with at least some of other steps or steps or stages of other steps.

Based on the same inventive concept, an embodiment of the present application further provides a detection apparatus for implementing the detection method involved above. The apparatus provides an implementation solution for solving the problems that is similar to the implementation solution described in the above method. Therefore, for specific limitations in one or more embodiments of the detection apparatus provided below, reference may be made to the above limitations on the detection method, which will not be repeated herein.

Referring to FIG. 9, FIG. 9 is a schematic structural diagram of a detection apparatus according to an embodiment of the present application. The detection apparatus 900 includes:

a first obtaining module 901 configured to obtain a first control instruction, where the first control instruction includes compensation information, and the compensation information is information determined based on a distance between a first camera and a material to be photographed; and a first control module 902 configured to control, based on the compensation information in the first control instruction, a first sliding assembly to move in a first direction to drive the first camera to move close to or away from the material to be photographed, where an included angle between the first direction and a vertical direction is less than or equal to a preset angle threshold.

In one of the embodiments, the detection apparatus 900 further includes:

a second control module configured to control, based on a second control instruction, a rotating assembly to rotate in a preset rotation direction to drive the first camera to rotate during photographing.

In one of the embodiments, the detection apparatus 900 includes:

a second obtaining module configured to obtain a third control instruction, where the third control instruction includes a center position of a sealing pin on the material to be photographed; and a third control module configured to control, based on the center position in the third control instruction, a second sliding assembly to move in a second direction to drive the first camera to move in the second direction.

In one of the embodiments, the detection apparatus further includes:

a fourth control module configured to control, based on a fourth control instruction, the second sliding assembly to move in a third direction to drive a second camera to move in the third direction.

In one of the embodiments, the third control module is further configured to: determine position adjustment information based on the center position, where the center position is a position determined based on a material picture photographed by the second camera; and control, based on the position adjustment information, the second sliding assembly to move in the second direction, such that the first camera rotates about the center position.

All or some of the modules in the above detection apparatus may be implemented by software, hardware, and a combination thereof. The modules above may be embedded, in the form of hardware, in or independent of a processor in a computer device, or may be stored, in the form of software, in a memory of the computer device, so as to be invoked by the processor to perform the operations corresponding to the modules above.

Figure 10:
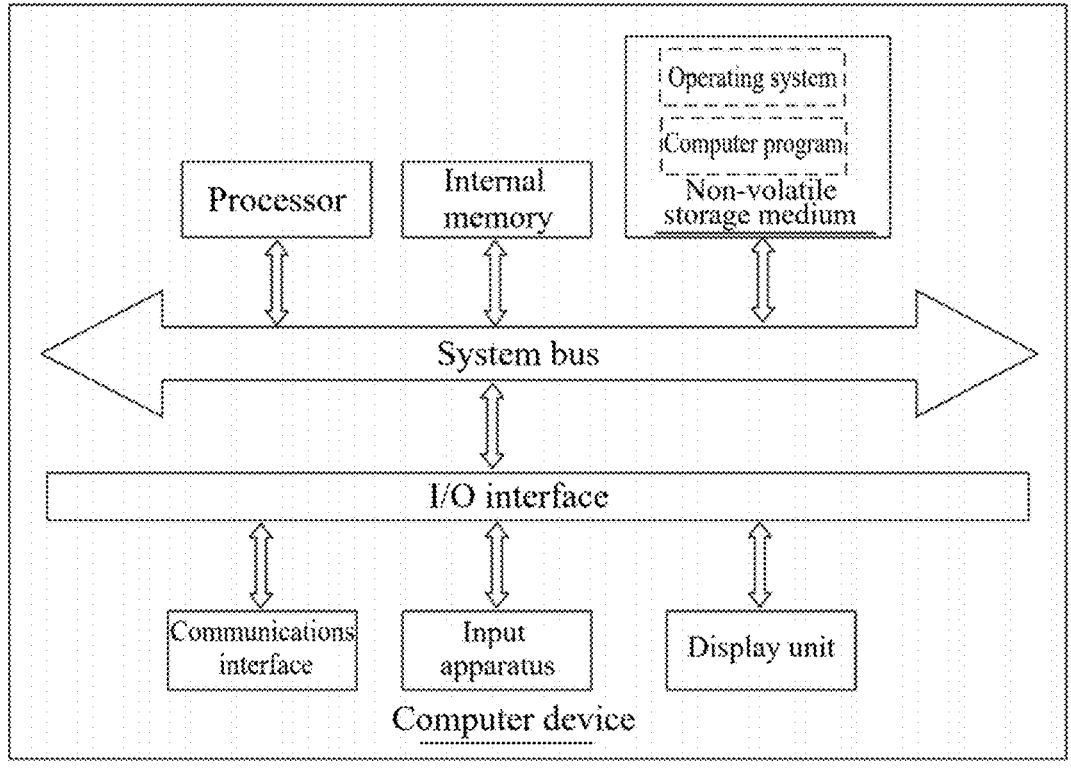
FIG. 10 is a schematic structural diagram of a computer device according to an embodiment of the present application.

In an embodiment, a computer device is provided. The computer device may be a terminal, and a diagram of an internal structural thereof may be as shown in FIG. 10. The computer device includes a processor, a memory, a communications interface, a display screen, and an input apparatus that are connected via a system bus. The processor of the computer device is used for providing computing and control capabilities. The memory of the computer device includes a non-volatile storage medium and an internal memory. The non-volatile storage medium stores an operating system and a computer program. The internal memory provides an environment for operation of the operating system and the computer program in the non-volatile storage medium. The communications interface of the computer device is used for wired or wireless communication with an external terminal, and the wireless method can be implemented by WIFI, a mobile cellular network, NFC (near-field communication), or other technologies. The computer program, when executed by the processor, implements a detection method. The display screen of the computer device may be a liquid crystal display or an electronic ink display. The input apparatus of the computer device may be a touch layer covering the display screen, or a key, trackball or trackpad set on a casing of the computer device, or an external keyboard, trackpad or mouse, etc.

Those skilled in the art can understand that a structure shown in FIG. 10 is merely a block diagram of part of the structure related to the solutions of the present application, and that does not constitute a limitation on the computer device to which the solutions of the present application are applied. Specifically, the computer device may include more or fewer components than those shown in the drawings, or combine some components, or have different component arrangements.

In an embodiment, a computer device is provided, which includes a memory and a processor, where the memory stores a computer program that, when executed by the processor, implements the following steps:

obtaining a first control instruction, where the first control instruction includes compensation information, and the compensation information is information determined based on a distance between a first camera and a material to be photographed; and controlling, based on the compensation information in the first control instruction, a first sliding assembly to move in a first direction to drive the first camera to move close to or away from the material to be photographed, where an included angle between the first direction and a vertical direction is less than or equal to a preset angle threshold.

In an embodiment, the computer program, when executed by the processor, further implements the following step:

controlling, based on a second control instruction, a rotating assembly to rotate in a preset rotation direction to drive the first camera to rotate.

In an embodiment, the computer program, when executed by the processor, further implements the following steps:

obtaining a third control instruction, where the third control instruction includes a center position of a sealing pin on the material to be photographed; and controlling, based on the center position in the third control instruction, a second sliding assembly to move in a second direction to drive the first camera to move in the second direction.

In an embodiment, the computer program, when executed by the processor, further implements the following step:

controlling, based on a fourth control instruction, the second sliding assembly to move in a third direction to drive a second camera to move in the third direction.

In an embodiment, the computer program, when executed by the processor, further implements the following steps:

determining position adjustment information based on the center position, where the center position is a position determined based on a material picture photographed by the second camera; and controlling, based on the position adjustment information, the second sliding assembly to move in the second direction, such that the first camera rotates about the center position.

In an embodiment, the computer program, when executed by the processor, further implements the following steps:

controlling, based on a fifth control instruction, a first horizontal sliding assembly to move in a first horizontal direction, and/or controlling a second horizontal sliding assembly to move in a second horizontal direction.

In an embodiment, a computer-readable storage medium is provided, which has stored thereon a computer program that, when executed by a processor, implements the following steps:

obtaining a first control instruction, where the first control instruction includes compensation information, and the compensation information is information determined based on a distance between a first camera and a material to be photographed; and controlling, based on the compensation information in the first control instruction, a first sliding assembly to move in a first direction to drive the first camera to move close to or away from the material to be photographed, where an included angle between the first direction and a vertical direction is less than or equal to a preset angle threshold.

In an embodiment, the computer program, when executed by the processor, further implements the following step:

controlling, based on a second control instruction, a rotating assembly to rotate in a preset rotation direction to drive the first camera to rotate.

In an embodiment, the computer program, when executed by the processor, further implements the following steps:

obtaining a third control instruction, where the third control instruction includes a center position of a sealing pin on the material to be photographed; and controlling, based on the center position in the third control instruction, a second sliding assembly to move in a second direction to drive the first camera to move in the second direction.

In an embodiment, the computer program, when executed by the processor, further implements the following step:

controlling, based on a fourth control instruction, the second sliding assembly to move in a third direction to drive a second camera to move in the third direction.

In an embodiment, the computer program, when executed by the processor, further implements the following steps:

determining position adjustment information based on the center position, where the center position is a position determined based on a material picture photographed by the second camera; and controlling, based on the position adjustment information, the second sliding assembly to move in the second direction, such that the first camera rotates about the center position.

In an embodiment, the computer program, when executed by the processor, further implements the following steps:

controlling, based on a fifth control instruction, a first horizontal sliding assembly to move in a first horizontal direction, and/or controlling a second horizontal sliding assembly to move in a second horizontal direction.

In an embodiment, a computer program product is provided, which includes a computer program that, when executed by a processor, implements the following steps:

obtaining a first control instruction, where the first control instruction includes compensation information, and the compensation information is information determined based on a distance between a first camera and a material to be photographed; and controlling, based on the compensation information in the first control instruction, a first sliding assembly to move in a first direction to drive the first camera to move close to or away from the material to be photographed, where an included angle between the first direction and a vertical direction is less than or equal to a preset angle threshold.

In an embodiment, the computer program, when executed by the processor, further implements the following step:

controlling, based on a second control instruction, a rotating assembly to rotate in a preset rotation direction to drive the first camera to rotate.

In an embodiment, the computer program, when executed by the processor, further implements the following steps:

obtaining a third control instruction, where the third control instruction includes a center position of a sealing pin on the material to be photographed; and controlling, based on the center position in the third control instruction, a second sliding assembly to move in a second direction to drive the first camera to move in the second direction.

In an embodiment, the computer program, when executed by the processor, further implements the following step:

controlling, based on a fourth control instruction, the second sliding assembly to move in a third direction to drive a second camera to move in the third direction.

In an embodiment, the computer program, when executed by the processor, further implements the following steps:

determining position adjustment information based on the center position, where the center position is a position determined based on a material picture photographed by the second camera; and controlling, based on the position adjustment information, the second sliding assembly to move in the second direction, such that the first camera rotates about the center position.

In an embodiment, the computer program, when executed by the processor, further implements the following steps:

controlling, based on a fifth control instruction, a first horizontal sliding assembly to move in a first horizontal direction, and/or controlling a second horizontal sliding assembly to move in a second horizontal direction.

It should be noted that user information (including, but not limited to, user device information, user personal information, etc.) and data (including, but not limited to, data for analysis, data for storage, data for display, etc.) involved in the present application are all information and data authorized by users or fully authorized by all parties.

Those skilled in the art can understand that all or some of the procedures in the methods in the above embodiments can be implemented by a computer program instructing related hardware. The computer program may be stored in a non-volatile computer-readable storage medium. The computer program, when executed, may include the procedures of the foregoing method embodiments. Any reference to a memory, a database, or other media used in the embodiments provided in the present application may include at least one of a non-volatile memory and/or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM), an external cache memory, etc. By way of illustration but not limitation, the RAM may be in various forms, such as a static random access memory (SRAM) or a dynamic random access memory (DRAM). The database involved in the embodiments provided in the present application may include at least one of a relational database or a non-relational database. The non-relational database may include a blockchain-based distributed database, etc., and is not limited thereto. The processor involved in the embodiments provided in the present application may be a general-purpose processor, a central processor, a graphics processor, a digital signal processor, a programmable logic device, a quantum computing-based data processing logic device, etc., and is not limited thereto.

The technical features of the above embodiments can be combined in any manner, and in order to simplify the description, not all possible combinations of the technical features of the above embodiments are described. However, as long as there is no conflict between the combinations of these technical features, they should be considered to be within the scope of the description in this application.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A detection apparatus, comprising a support, at least one driving apparatus provided on the support, a first movable module, and a second movable module, wherein:
the at least one driving apparatus comprises a first driving apparatus, a second driving apparatus, and a third driving apparatus, the first driving apparatus is connected to the first movable module, the second driving apparatus is provided on the first movable module, the third driving apparatus is connected to the second movable module, and the second movable module is connected to the first movable module;
the first movable module is provided with a first sliding assembly, a first camera connected to the first sliding assembly, and a rotating assembly connected to the first camera;
the second movable module is provided with a second sliding assembly connected to the first camera;
the first driving apparatus is configured to:
obtain a first control instruction, the first control instruction comprising compensation information, and the compensation information being determined based on a distance between a material to be photographed and the first camera, and a preset depth of field range of the first camera; and control, based on the compensation information in the first control instruction, the first sliding assembly to move in a first direction to drive the first camera to move close to or away from the material to be photographed, wherein an included angle between the first direction and a vertical direction is less than or equal to a preset angle threshold;
the second driving apparatus is configured to control, based on a second control instruction, the rotating assembly to rotate in a preset rotation direction to drive the first camera to rotate; and
the third driving apparatus is configured to:
obtain a third control instruction, wherein the third control instruction comprises a center position of a sealing pin on the material to be photographed; and
control, based on the center position in the third control instruction, the second sliding assembly to move in a second direction to drive the first camera to move in the second direction.

2. The detection apparatus according to claim 1, wherein:
the detection apparatus further comprises a second camera connected to the second sliding assembly;
the second camera is provided with a coaxial light source and a ring light source;
the third driving apparatus is further configured to control the second sliding assembly to move in a third direction to drive the second camera to move in the third direction;
the coaxial light source is configured to light an inner region of a weld bead on the material to be photographed; and
the ring light source is configured to light an outer region of the weld bead.

3. The detection apparatus according to claim 1, wherein:
the second movable module comprises a first horizontal module and a second horizontal module connected to each other;
the first horizontal module and the second horizontal module are both connected to the first movable module;
the second sliding assembly comprises a first horizontal sliding assembly provided on the first horizontal module and a second horizontal sliding assembly provided on the second horizontal module; and
the third driving apparatus is configured to control the first horizontal sliding assembly to move in a first horizontal direction, and/or control the second horizontal sliding assembly to move in a second horizontal direction.

4. A detection method, applied to the detection apparatus according to claim 1, the method comprising:
obtaining the first control instruction, wherein the first control instruction comprises the compensation information; and
controlling, based on the compensation information in the first control instruction, the first sliding assembly to move in the first direction to drive the first camera to move close to or away from the material to be photographed.

5. The detection method according to claim 4, further comprising:
controlling, based on the second control instruction, the rotating assembly to rotate in the preset rotation direction to drive the first camera to rotate.

6. The detection method according to claim 5, further comprising:
obtaining the third control instruction; and
controlling, based on the center position in the third control instruction, the second sliding assembly to move in the second direction to drive the first camera to move in the second direction.

7. The detection method according to claim 6, further comprising:

controlling, based on a fourth control instruction, the second sliding assembly to move in a third direction to drive a second camera to move in the third direction.

8. The detection method according to claim 6, wherein controlling, based on the center position in the third control instruction, the second sliding assembly to move in the second direction comprises:

determining position adjustment information based on the center position, wherein the center position is a position determined based on a material picture photographed by a second camera; and controlling, based on the position adjustment information, the second sliding assembly to move in the second direction, such that the first camera rotates about the center position.

9. The detection method according to claim 6, further comprising:

controlling, based on a fifth control instruction, a first horizontal sliding assembly to move in a first horizontal direction, and/or controlling a second horizontal sliding assembly to move in a second horizontal direction.

10. A computer device, comprising a memory and a processor, wherein the memory stores a computer program that, when executed by the processor, implements the method according to claim 4.

11. A non-transitory computer-readable storage medium having stored thereon a computer program that, when executed by a processor, implements the method according to claim 4.

12. The detection apparatus according to claim 1, wherein:

the second movable module comprises a first horizontal module and a second horizontal module connected to each other;

the first horizontal module and the second horizontal module are both connected to the first movable module;

the second sliding assembly comprises a first horizontal sliding assembly provided on the first horizontal module and a second horizontal sliding assembly provided on the second horizontal module; and the second driving apparatus is configured to control the first horizontal sliding assembly to move in a first horizontal direction, and/or control the second horizontal sliding assembly to move in a second horizontal direction.

13. A method comprising:

obtaining a first control instruction, wherein the first control instruction comprises compensation information, and the compensation information is determined based on a distance between a first camera of a detection apparatus and a material to be photographed;

controlling, based on the compensation information in the first control instruction, a first sliding assembly of the detection apparatus to move in a first direction to drive the first camera to move close to or away from the material to be photographed;

obtaining a second control instruction, wherein the second control instruction comprises a center position of a sealing pin on the material to be photographed; and controlling, based on the center position in the second control instruction, a second sliding assembly of the detection apparatus to move in a second direction to drive the first camera to move in a second direction, comprising:

determining position adjustment information based on the center position, wherein the center position is a position determined based on a material picture photographed by a second camera of the detection apparatus; and controlling, based on the position adjustment information, the second sliding assembly to move in the second direction, such that the first camera rotates about the center position.

14. A detection apparatus, comprising a support, at least one driving apparatus provided on the support, and a first movable module, wherein:

the at least one driving apparatus comprises a first driving apparatus, and the first driving apparatus is connected to the first movable module;

the first movable module is provided with a first sliding assembly, and a first camera connected to the first sliding assembly;

the first driving apparatus is configured to:

obtain a first control instruction, the first control instruction comprising compensation information, and the compensation information being determined based on a distance between a material to be photographed and the first camera, and a preset depth of field range of the first camera; and control, based on the compensation information in the first control instruction, the first sliding assembly to move in a first direction to drive the first camera to move close to or away from the material to be photographed, wherein an included angle between the first direction and a vertical direction is less than or equal to a preset angle threshold;

the at least one driving apparatus further comprises a second driving apparatus, wherein the second driving apparatus is connected to a second movable module, and the second movable module is connected to the first movable module;

the second movable module is provided with a second sliding assembly connected to the first camera;

the second driving apparatus is configured to control the second sliding assembly to move in a second direction to drive the first camera to move in the second direction;

the second movable module comprises a first horizontal module and a second horizontal module connected to each other;

the first horizontal module and the second horizontal module are both connected to the first movable module;

the second sliding assembly comprises a first horizontal sliding assembly provided on the first horizontal module and a second horizontal sliding assembly provided on the second horizontal module; and the second driving apparatus is configured to control the first horizontal sliding assembly to move in a first horizontal direction, and/or control the second horizontal sliding assembly to move in a second horizontal direction.

* * * * *